(12) United States Patent
Wagener et al.

(10) Patent No.: US 6,431,581 B1
(45) Date of Patent: Aug. 13, 2002

(54) HOUSING FOR THE AIR BAG IN A MOTOR VEHICLE

(75) Inventors: Keit Wagener, Bissendorf; Hans-Jürgen Imken, Hunteburg; Jürgen Klenk, Ginsheim; Ulrich Rick, Roxheim, all of (DE)

(73) Assignee: Lemförder Metallwaren AG (DE)

( * ) Notice: Subject to any disclaimer, the term of this patent is extended or adjusted under 35 U.S.C. 154(b) by 0 days.

(21) Appl. No.: 09/016,492

(22) Filed: Jan. 30, 1998

(30) Foreign Application Priority Data

Feb. 1, 1997 (GB) .......................... 197 03 767

(51) Int. Cl.[7] ............................................ B60R 21/16
(52) U.S. Cl. ................................. 280/728.2; 280/740
(58) Field of Search ........................... 280/732, 728.2, 280/736

(56) References Cited

U.S. PATENT DOCUMENTS

| | | | | |
|---|---|---|---|---|
| 4,915,410 A | * | 4/1990 | Bachelder .................. 280/732 |
| 5,096,222 A | * | 3/1992 | Komerska et al. .......... 280/732 |
| 5,186,492 A | * | 2/1993 | Wright et al. ............... 280/743 |
| 5,211,421 A | * | 5/1993 | Catron ........................ 280/728 |
| 5,490,690 A | * | 2/1996 | Mihm ...................... 280/728.2 |
| 5,577,764 A | * | 11/1996 | Webber et al. .......... 280/728.2 |

* cited by examiner

Primary Examiner—Brian L. Johnson
Assistant Examiner—Gerald Klebe
(74) Attorney, Agent, or Firm—McGlew and Tuttle, P.C.

(57) ABSTRACT

A one-piece housing that can be manufactured in one operation for an inflatable air bag in a motor vehicle is described, in which the housing has two chambers, one of which accommodates the air bag module and the other is a diffusor chamber with chamber walls having gas passage openings, into which the gas generator is introduced. Reinforcing ribs of the housing are made in one piece with the diffusor chamber wall.

19 Claims, 4 Drawing Sheets

HOUSING FOR THE AIR BAG IN A MOTOR VEHICLE

FIELD OF THE INVENTION

The present invention pertains to an inflatable air bag in a motor vehicle with fastening brackets made in one piece with the housing and having a diffusor with an inserted gas generator.

BACKGROUND OF THE INVENTION

Inflatable air bags have been increasingly used in the manufacture of modern automobiles. The air bag is accommodated together with an inflating means in a housing. The inflating means is also called a gas generator. The system is ignited via sensors. Many different variants of housings for inflatable air bags have been known. For example, DE 41 41 617 A1 discloses a vehicle air bag module in which a folded air bag and an inflating means are together accommodated in a housing and are inserted into the vehicle as a complete assembly unit. In the solution shown in that document, the housing has two compartments: a front compartment and a rear compartment. An inflating means is inserted into the rear compartment. This inflating means comprises a cylindrical outer housing, in which a plurality of nozzles are provided. The cylindrical outer housing is called the diffusor. The diffusor is used to accommodate the gas generator. The holes of the diffusor are arranged in the housing of the air bag unit such that a directed discharge of the gas into the air bag can take place. Without a diffusor, the gas would spread out in a nonuniform manner after the gas generator has been ignited. This would not be desirable, because the air bag must be inflated reliably, dependably and uniformly within a fraction of one second in order to function according to its intent.

The diffusor with the gas generator inserted into it is introduced into a mount in one side wall of the housing and is screwed to the opposite housing wall via a threaded shaft.

The entire housing construction is composed of a plurality of individual parts in the design shown in that document. The housing itself is manufactured as a sheet metal part.

Besides the manufacture, which is complicated for technological reasons, such a housing has the drawback of having a high intrinsic weight.

To compensate these drawbacks, it is proposed in DE 43 38 666 A1 that a housing for an air bag be made of plastic. Plastic offers a considerable reduction in weight compared with metallic materials. In addition, the brackets for fastening the housing in the motor vehicle are made in one piece with the plastic housing in the solution described in this document. However, to achieve an optimal discharge of the gas to inflate the air bag in this air bag housing as well, it is necessary to additionally use a diffusor. The diffusor comprises here a cylindrical aluminum molding, into which the gas generator is inserted. After the diffusor has been inserted into the space provided for it in the housing, the gas generator is mounted.

SUMMARY AND OBJECTS OF THE INVENTION

The present invention is primarily based on the technical object of developing a housing for the inflatable air bag in a motor vehicle that can be manufactured in a simpler manner and at a lower cost than prior-art designs.

This technical problem is solved by forming the housing in one-piece with two chambers, where one of which is a diffusor chamber with chamber walls having flow-optimized gas passage openings. The housing includes reinforcing ribs made in one piece with the diffusor chamber wall and extending across the first chamber to increase the strength of the housing. The first chamber is connected to the second chamber and are together formed in one piece with a plurality of fastening brackets. The gas passage openings are positioned between the plurality of reinforcing ribs. The first chamber is capable of receiving the air bag and the plurality of reinforcing ribs space the airbag from the gas passage openings.

A housing according to the present invention is made in one piece together with the brackets and with the diffusor accommodating the gas generator. It advantageously consists of plastic and is manufactured according to the injection molding process. Plastic as a material presents itself to be suitable because it is easy to process and makes it possible to greatly reduce the weight compared with designs made of metal. In addition, it is advantageous to make plug-type fasteners, cable clamps or other necessary components in one piece with the housing, so that the housing can be manufactured in one operation according to the injection molding process and additional components no longer need to be manufactured and mounted.

However, the housing may also consist according to the present invention of an aluminum housing manufactured according to the aluminum diecasting process.

The housing consisting of two chambers with a front chamber for accommodating the folded air bag or air bag module and a rear chamber for mounting the gas generator. The rear chamber is designed as a diffusor. Reinforcing ribs, with which the folded air bag is to come into contact, should be advantageously provided at the outer wall of this diffusor chamber. The reinforcing ribs stabilize the housing, on the one hand, and, on the other hand, they guarantee a distance between the air bag module and the rear chamber of the housing. The flow-optimized air passage openings, which are designed in terms of their cross section and their arrangement such that the air bag will be inflated uniformly, are provided between the reinforcing ribs.

The diffusor chamber is preferably closed on one side, except for a fastening opening. Another opening for introducing the gas generator is located on the opposite side. This opening is reinforced in its edge area, and it should also have a contact area that can be used as a seal. This could be designed as, e.g., a labyrinth. The gas generator introduced into this opening has a circular radial flange having a shape complementary to the contact area. This radial flange is surrounded by a seal, which is fitted into the contact area of the diffusor chamber wall during the mounting of the gas generator. The mounting of the gas generator is performed in a very simple manner, e.g., by means of a screw connection. It is, of course, also possible to lock the gas generator by means of a snap-on connection or in another way in the diffusor chamber.

In the case of a screw connection, a screw bolt, which is introduced into the fastening opening of the diffusor chamber and passes through same, is fastened on one side to the gas generator on the side opposite the radial flange. The gas generator is then screwed on with a nut from the free, outer side of the housing. To guarantee an optimal sealing function, a sealing element may additionally also be provided on the screw connection side of the gas generator. A sealing action can, of course, also be achieved even by the screw bolt arranged at the gas generator engaging in some areas a complementarily shaped mount in the fastening opening.

By tightening the screw connection, the seal between the gas generator cover and the contact area of the diffusor chamber wall also becomes effective. The gas generator is made smaller according to the present invention than the diffusor chamber accommodating it. An air gap is thus left around the gas generator after the installation of the gas generator in the diffusor chamber, and this air gap makes possible the flow-optimized and uniform distribution of the gas expanding after the ignition before it escapes through the gas passage openings into the air bag.

In addition, the air gap can also prevent the ignited gas generator from fusing with the housing, because experience has shown that, depending on the design of the gas generator, extremely high temperatures develop immediately after the ignition of the gas generator. The air gap thus prevents a fusion of the gas generator and the plastic housing, which would cause recycling to be almost impossible after the fusion of the gas generator with the housing.

To meet the high requirements imposed in terms of strength on a housing according to the present invention for accommodating an air bag in a motor vehicle, it is advantageous to design the chamber for accommodating the air bag module as a multiwalled chamber. A multiwalled design is especially efficient if the outer wall of the chamber is formed by more than two parallel chamber systems, which are separated from one another. Extremely high forces, which expand the housing to the outside in the shape of a fish mouth, are generated immediately after the ignition in the area of the outlet of the air bag. The greatest expansion takes place approximately in the middle in the area of the free opening of the chamber. The surrounding components may be damaged due to this fish mouth-like expansion of the housing, and this damage is avoidable. A further improvement in the rigidity of the housing can be achieved, besides the multiwalled design of the chamber wall, especially by the chamber wall accommodating the air bag being additionally provided with reinforcing ribs on the outside. These reinforcing ribs are effective only if they extend, e.g., in a star pattern or arc-shaped pattern, beginning from the weakest point of the chamber wall. The weakest point of the chamber wall is located on the front side of the chamber opening approximately in the middle, because the chamber wall can move over the longest free path at this point. Honeycomb structures have also proved to be better than the prior-art contours which have a rectangular shape in the top view. While the strength is improved, the wall thickness may even be reduced compared with prior-art designs in the case of structuring and at the same time multiwalled design of the chamber wall.

In addition, a considerable advantage is obtained in terms of the stability of a housing according to the present invention if the front chamber accommodating the air bag module expands toward its opening, i.e., it has a V-shaped cross section. Such a design makes possible an improved expansion of the air bag during the inflation process.

The better possibilities of adaptation to the area of mounting and the simplified mounting resulting therefrom are advantageous in a housing according to the present invention for an inflatable air bag in a motor vehicle. The minimization of the weight thus also makes possible manufacture at a lower cost as a consequence of the possible saving of material, without having to accept restrictions in terms of safety, while the strength is improved at the same time. Last but not least, a housing according to the present invention can also be removed in a simple manner, and it better meets the increased requirements in terms of recycling than prior-art designs.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
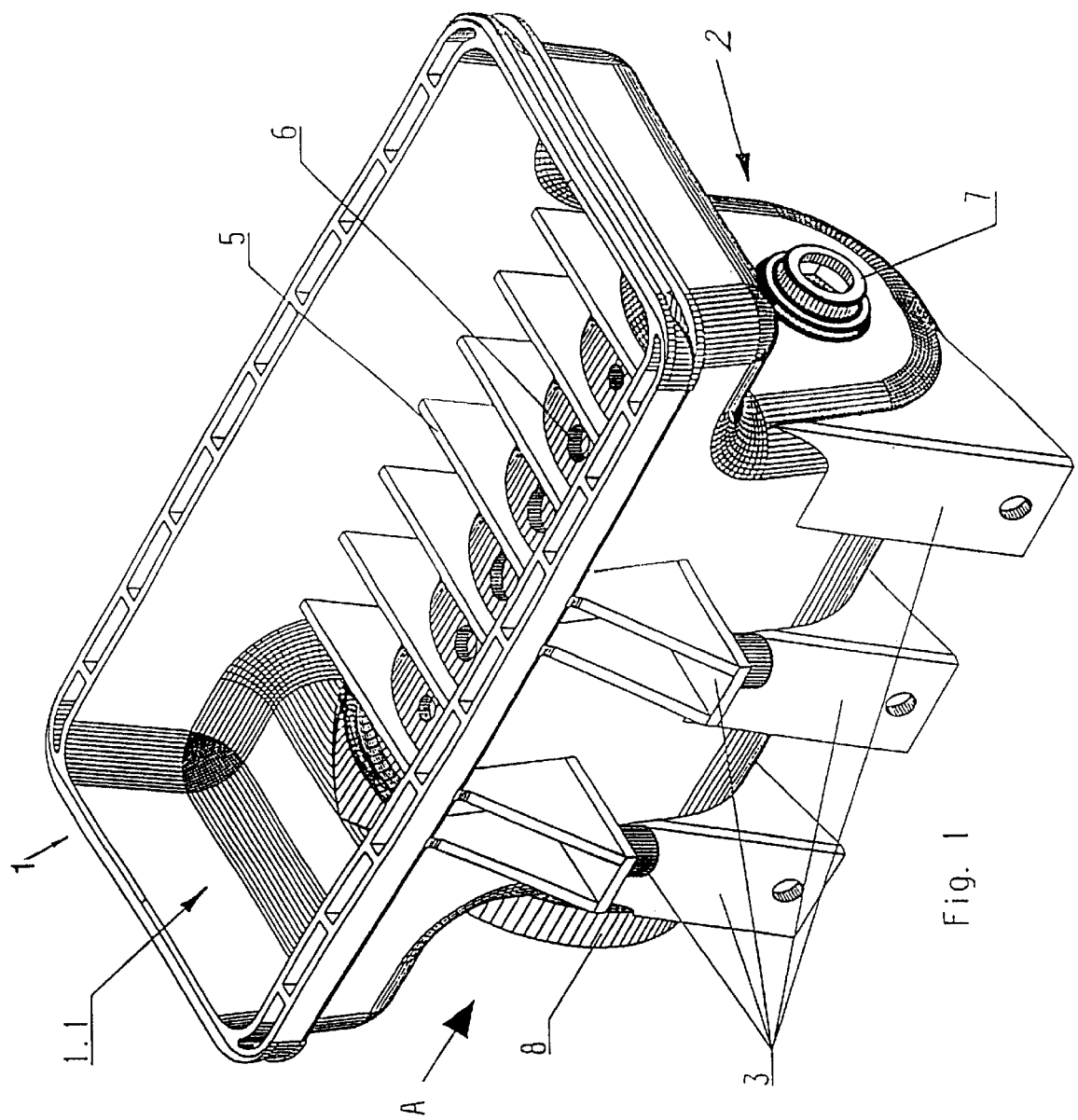
FIG. 1 is a three-dimensional representation of a housing according to the present invention for an inflatable air bag in a motor vehicle.

Referring to the drawings, and in particular to FIG. 1, a three-dimensional representation of a housing 1 according to the present invention is shown for an inflatable air bag in a motor vehicle. Such a housing 1 is made in one piece together with the brackets 3 and is provided with a gas generator 4. The housing consists of plastic and is manufactured according to the injection molding process. The housing 1, consisting of two chambers, has a front chamber portion 1.1 for accommodating the folded air bag or air bag module, and a rear chamber portion 2 for mounting the gas generator 4. The rear chamber portion 2 is designed as a diffusor (i.e. providing a diffuser chamber). Reinforcing ribs 5, with which the folded air bag is to come into contact, are made in one piece with the outer wall of the rear chamber portion 2. The reinforcing ribs 5 stabilize the housing 1, on the one hand, and, on the other hand, they guarantee a distance between the air bag module and the rear chamber portion 2 of the housing. The gas passage openings 6 are arranged between the reinforcing ribs 5. The rear chamber portion 2 is closed on one side, except for a fastening opening 7. An opening for introducing the gas generator 4 is located on the opposite side. The gas generator 4, not shown in FIG. 1, is pushed into the rear chamber portion 2 in the direction of the arrow designated by A. The opening has a reinforced edge area 8, which is provided on the inside with a contact area designed as a labyrinth seal.

Figure 2:
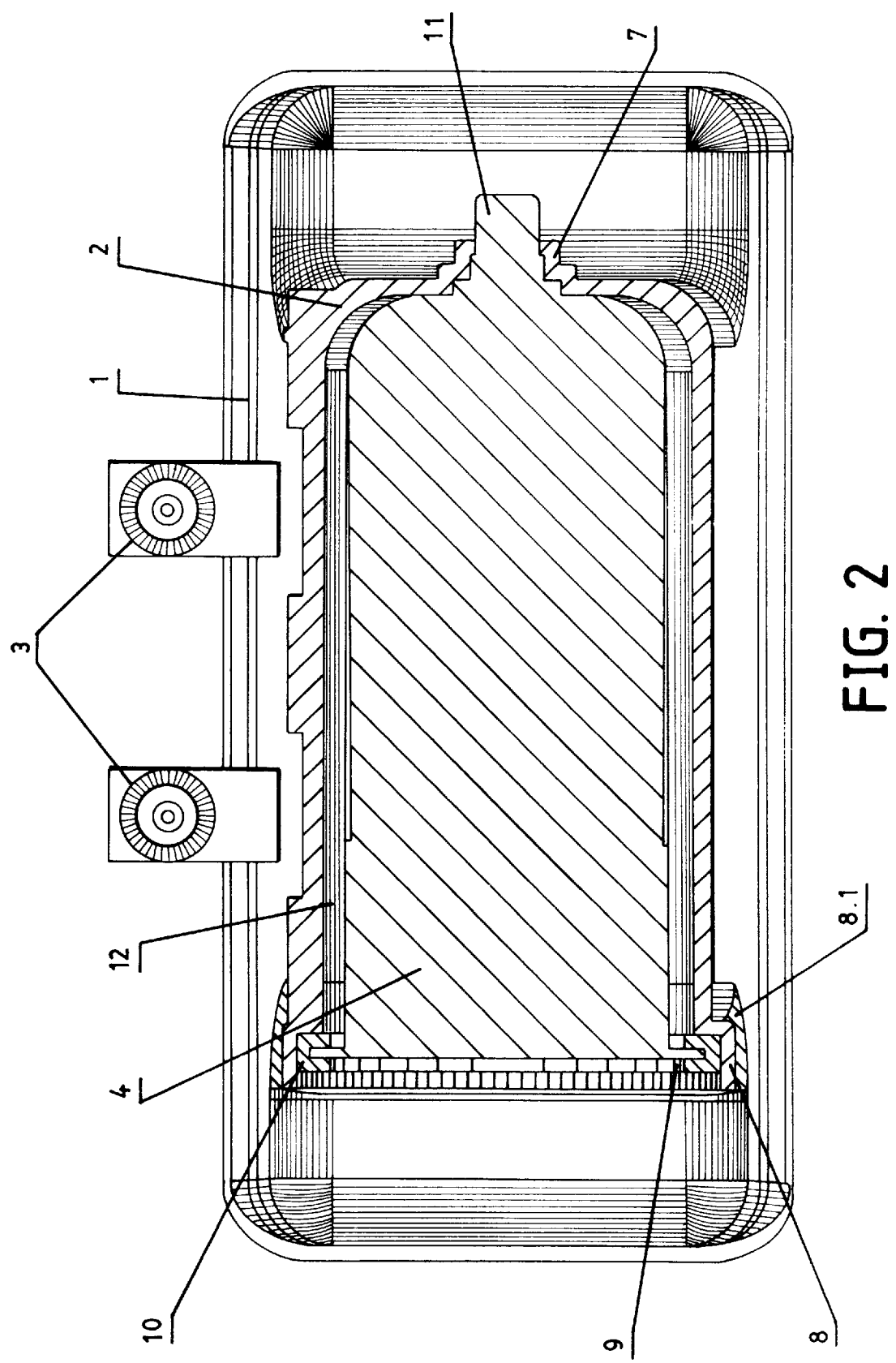
FIG. 2 is a three-dimensional representation of a housing according to the present invention for an inflatable air bag in a motor vehicle with a partial section through the diffusor chamber.
Figure 3:
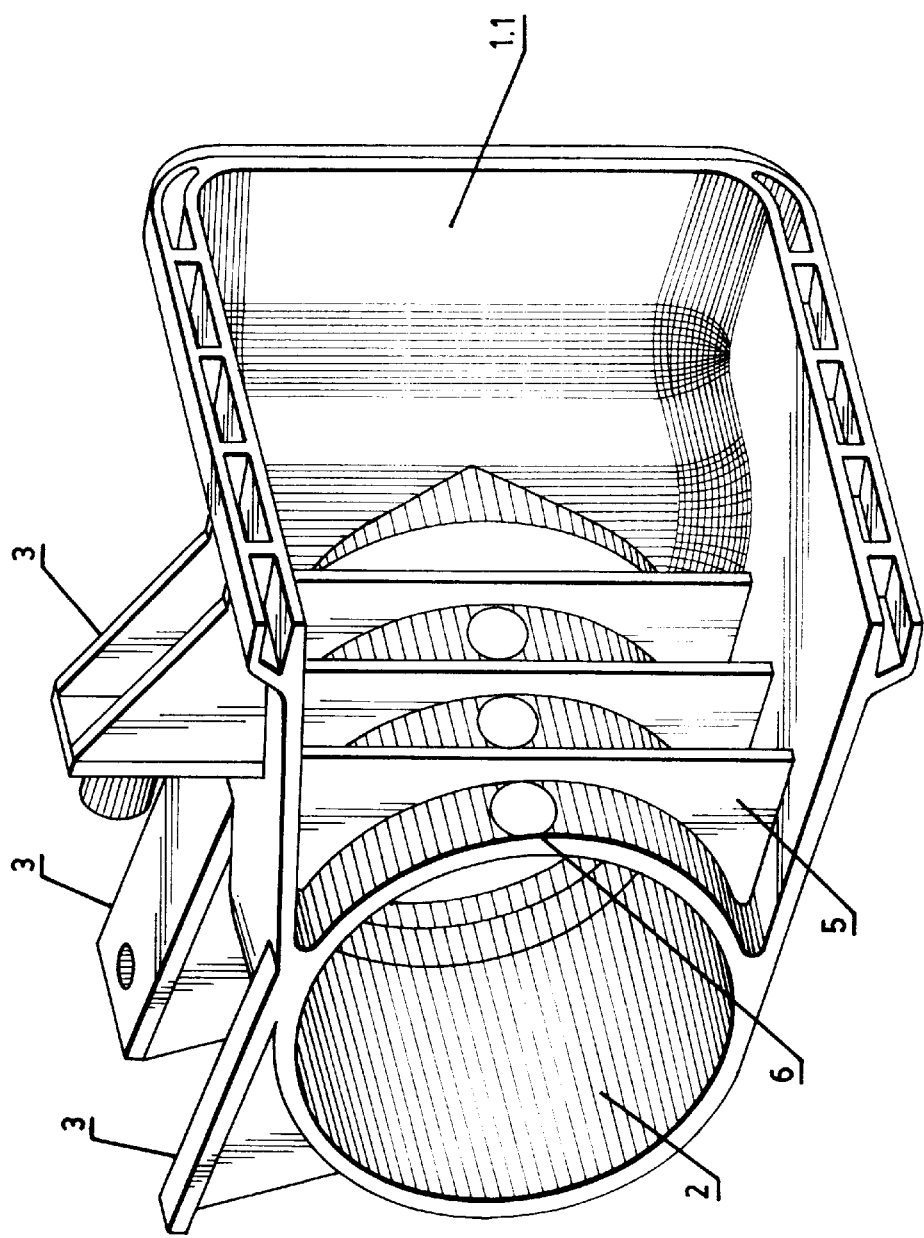
FIG. 3 is a perspective cross-sectional view of the housing.
Figure 4:
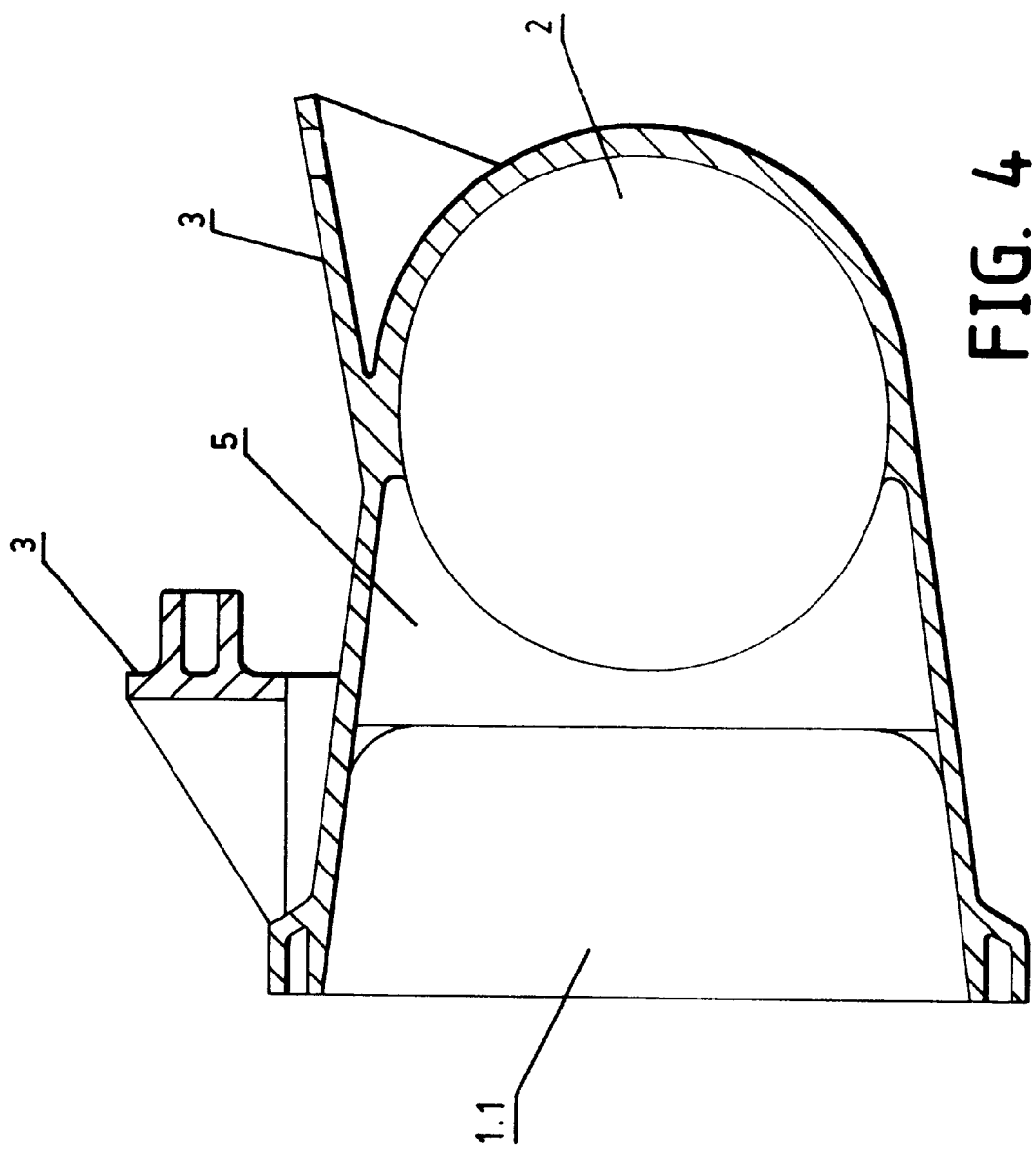
FIG. 4 is a straight cross-sectional view of the housing.

FIG. 2 shows a three-dimensional representation of a housing 1 according to the present invention for an inflatable air bag in a motor vehicle with a partial section through the rear chamber portion 2.

The rear chamber portion 2 has, on one side, an opening, whose edge area 8 is reinforced. The edge area 8 also has a contact area 8.1.

The gas generator 4 introduced into the opening is provided on one side with a radial flange 9 shaped complementarily to the contact area 8.1. This radial flange 9 is surrounded by a seal 10, which is fitted into the contact area 8.1 of the diffusor chamber wall during the mounting of the gas generator 4. The mounting of the gas generator 4 takes place in a very simple manner by means of a screw connection. A screw bolt 11, which is introduced into the fastening opening 7 of the rear chamber portion 2 and passes through same, is fastened on one side to the gas generator 4. The gas generator 4 is then locked from the free outer side of the housing by means of a nut, not shown in FIG. 2, in the usual manner. To improve the sealing action, the screw bolt 11 arranged at the gas generator engages in some areas a complementarily shaped mount in the fastening opening 7.

The seal 10 between the radial flange 9 of the gas generator 4 and the contact area 8.1 of the diffusor chamber wall also becomes effective due to the screw connection being tightened.

The gas generator 4 is made smaller according to the present invention than the rear chamber 2 accommodating the gas generator 4. Thus, an air gap 12 is left between the gas generator 4 and the wall of the rear chamber portion 2 after the installation of the gas generator in the diffusor chamber, and this air gap makes possible the flow-optimized and uniform distribution of the gas expanding after the ignition before it escapes through the gas passage openings 6, not shown in FIG. 2, into the air bag. This feature contributes to the optimization of the flow passages 6, particularly as to the arrangement of such passages 6 relative to the uniformly distributed flow in the chamber portion 2.

The brackets 3 are designed as projecting parts of the housing 1 in the known manner and are made in one piece with same.

The features described in specification, drawings, abstract, and claims, can be used individually and in arbitrary combinations for practicing the present invention.

While specific embodiments of the invention have been shown and described in detail to illustrate the application of the principles of the invention, it will be understood that the invention may be embodied otherwise without departing from such principles.

APPENDIX

List of Reference Numbers
1 Housing
1.1 Front chamber
2 Diffusor chamber
3 Bracket
4 Gas generator
5 Reinforcing ribs
6 Gas passage openings
7 Fastening opening
8 Reinforced edge area
8.1 Contact area
9 Radial flange
10 Seal
11 Screw bolt
12 Air gap

What is claimed is:

1. A housing for an inflatable air bag in a motor vehicle, the housing being a one piece housing comprising:

a first chamber portion defining an air bag space;

a second chamber portion defining a gas generator space for receiving a gas generator and with a diffusor wall portion defining gas passage openings providing communication between said gas generator space and said air bag space; and a plurality of reinforcing ribs formed in one piece with said diffusor wall portion.

2. A housing in accordance with claim 1, wherein:

said first chamber portion and said second chamber portion and said plurality of reinforcing ribs are formed as an injection molded part.

3. A housing in accordance with claim 1, wherein:

said first chamber portion and said second chamber portion and said plurality of reinforcing ribs are formed as a diecast aluminum part.

4. A housing in accordance with claim 1, wherein:

said first chamber portion has a V-shaped cross section.

5. A housing in accordance with claim 2, wherein:

said first chamber portion has a V-shaped cross section.

6. A housing in accordance with claim 3, wherein:

said first chamber portion has a V-shaped cross section.

7. A housing in accordance with claim 1, wherein:

said first chamber portion is directly connected to said second chamber portion;

said plurality of reinforcing ribs form strengthening means for strengthening the one piece housing;

said plurality of reinforcing ribs extend across said first chamber portion;

at least one opening of said gas passage openings is positioned between each pair of adjacent ribs of said plurality of reinforcing ribs;

said plurality of reinforcing ribs provide a space between the airbag and said gas passage openings.

8. A housing in accordance with claim 1, wherein:

said gas passage openings are positioned at predetermined locations along said diffusor wall portion; and a plurality of fastening brackets are formed in one piece with said first and second chambers.

9. A housing in accordance with claim 1, wherein:

said second chamber portion is dimensioned to have an inner surface spaced from an outer surface of the gas generator to prevent fusing of said inner surface with said outer surface.

10. A housing in accordance with claim 2, wherein:

said second chamber portion is dimensioned to have an inner surface spaced from an outer surface of the gas generator to prevent fusing of said inner surface with said outer surface.

11. A motor vehicle inflatable air bag housing, comprising: a single piece housing element including a first portion with angled wall portions forming an approximately V-shaped configuration in cross-section, a plurality of reinforcing ribs, each rib, of said reinforcing ribs, extending between said angled wall portions, said first portion defining a gas bag space, and a second chamber portion defining a gas generator space for receiving a gas generator and with a diffusor wall portion separating said gas generator space and said air bag space, said diffusor wall portion defining gas passage openings providing communication between said gas generator space and said air bag space, each of said ribs being joined to said diffusor wall portion.

12. A housing in accordance with claim 11, wherein: said single piece housing is one of an injection molded part and a diecast aluminum part.

13. A housing in accordance with claim 11, wherein: said plurality of reinforcing ribs include pairs of adjacent reinforcing ribs, at least one opening of said gas passage openings is positioned between each pair of adjacent ribs of said plurality of reinforcing ribs.

14. A housing in accordance with claim 11, wherein:

said gas passage openings are positioned at predetermined locations along said diffusor wall portion; and a plurality of fastening brackets are formed in one piece with said first portion and said second portion.

15. A housing in accordance with claim 11, wherein:
said second chamber portion is dimensioned to have an inner surface spaced from an outer surface of the gas generator to prevent fusing of said inner surface with said outer surface.

16. A motor vehicle inflatable air bag housing and gas generator combination, the combination comprising:

a single piece housing element including a first chamber portion with wall portions, a plurality of reinforcing ribs, each rib, of said reinforcing ribs, extending between said wall portions, said first portion defining a gas bag space, and a second chamber portion defining a gas generator space, said second chamber portion having a diffusor wall portion separating said gas generator space and said air bag space, said diffusor wall portion defining gas passage openings providing communication between said gas generator space and said air bag space, each of said ribs being joined to said diffusor wall portion; and a gas generator, said second chamber portion is dimensioned to have an inner surface spaced from an outer surface of said gas generator.

17. The combination in accordance with claim 16, wherein: said single piece housing is one of an injection molded part and a diecast aluminum part.

18. The combination in accordance with claim 16, wherein: said plurality of reinforcing ribs include pairs of adjacent reinforcing ribs, at least one opening of said gas passage openings is positioned between each pair of adjacent ribs of said plurality of reinforcing ribs.

19. The combination in accordance with claim 16, wherein:

said gas passage openings are positioned at predetermined locations along said diffusor wall portion; and a plurality of fastening brackets are formed in one piece with said first portion and said second portion.

* * * * *